(12) United States Patent
Meier (10) Patent No.: US 6,847,620 B1
(45) Date of Patent: Jan. 25, 2005

(54) MOBILE VIRTUAL LAN

(75) Inventor: Robert C. Meier, Cedar Rapids, IA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/569,548

(22) Filed: May 12, 2000

(Under 37 CFR 1.47)

Related U.S. Application Data (60) Provisional application No. 60/133,996, filed on May 13, 1999.

(51) Int. Cl.[7] ............................................ H04Q 7/00

(52) U.S. Cl. ...................................... 370/328; 370/401

(58) Field of Search .............................. 370/328, 230, 370/235, 469, 401, 395.53, 465; 380/247, 270

(56) References Cited

U.S. PATENT DOCUMENTS

| | | | |
|---|---|---|---|
| 5,960,344 A | * | 9/1999 | Mahany |
| 6,307,837 B1 | * | 10/2001 | Ichikawa et al. ........... 370/230 |
| 6,314,108 B1 | * | 11/2001 | Ramasubramani et al. . 370/465 |

* cited by examiner

*Primary Examiner*—Kwang Bin Yao
*Assistant Examiner*—Alexander O. Boakye
(74) *Attorney, Agent, or Firm*—John M. Cone; Akin Gump Strauss Hauer & Feld, LLP (57) ABSTRACT

A communication system in which multiple protocols and proxy services are executed by an access point. In one embodiment of the invention, GVRP and GMRP registrations are combined in a single packet when a wireless device roams to a different VLAN. In addition, outbound GVRP and GMRP multicast messages are handled by an access point (also referred to as a GVRP and GMRP "gateway") such that the wireless device is not burdened with the associated computational overhead. In a further embodiment, a wireless device may dynamically switch between a VLAN-aware state and a VLAN-unaware state depending on the nature of a detected access point. For example, if a relevant access point supports GVRP, the wireless device may operate as a VLAN terminal. If a wireless device is not attached to an access point with a matching VLAN ID, the wireless device sends and receives VLAN tagged frames. If a wireless device configured with a VLAN ID is attached to an access point with a matching VLAN ID, or if the wireless device is attached to a non-VLAN access point, then the wireless device may send and receive raw/untagged frames. In addition to the gateways described below, the ability of a wireless device to detect when it can send untagged frames is considered novel. In another embodiment of the invention, a special ID that is different than the native VLAN ID for a switch port is used for VLAN-unaware devices. This allows such devices that do not issue tagged frames to belong to a single VLAN ID.

7 Claims, 3 Drawing Sheets

MOBILE VIRTUAL LAN

CROSS-REFERENCE TO RELATED APPLICATIONS

The present application claims the benefit of U.S. Provisional Application No. 60/133,996, filed May 13, 1999, which is hereby incorporated by reference in its entirety for all purposes.

BACKGROUND OF THE INVENTION

Virtual local area network ("VLAN") standards have been developed for use by stationary clients or stations. For example, the IEEE 802.1Q standard focuses on stationary devices. Problems such as diminished bandwidth on a radio frequency medium, computational overhead (e.g., status messaging), and power management concerns associated with periodic multicast traffic have generally limited the applicability of such standards to mobile-enabled or portable devices.

To strictly adhere to GARP (Generic Attribute Registration Protocol) and other supplemental protocols such as GVRP (GARP VLAN Registration Protocol), mobile stations would generally have to send many multiple messages every time roaming occurred (e.g., associate with an access point, register VLAN information). GVRP is used to propagate VLAN membership information throughout a switched network when a mobile device or station moves. If the station also participates in other protocols such as GMRP (GARP Multicast Reservation Protocol) (used for dynamic multicast address filtering), mobile stations would have to send additional registration packet(s) and handle and respond to corresponding messages. Again, power management and bandwidth issues may arise in such a system.

SUMMARY OF THE INVENTION

In a communication system according to the disclosed embodiment of the invention, multiple protocols are executed mainly by access points. In one embodiment of a communication system according to the invention, GVRP and GMRP registrations are combined in a single packet when a wireless device roams to a different VLAN. In addition, outbound GVRP and GMRP multicast messages are handled by an access point (also referred to as a GVRP and GMRP "gateway") such that the wireless device is not burdened with the associated computational overhead.

Virtual local area networking in a wireless environment also permits logical grouping of wireless devices/stations regardless of physical location. In addition, such mobility implies that devices can be moved from one switch port to another switch port without reconfiguring the network layer stack. The devices maintain a logical VLAN assignment.

It is contemplated that a wireless device implemented in accordance with the present invention may dynamically switch between a VLAN-aware state and a VLAN-unaware state depending on the nature of a detected access point. For example, if a relevant access point supports GVRP, the wireless device may operate as a VLAN terminal.

If a wireless device is not attached to an access point with a matching VLAN ID, the wireless device sends and receives VLAN tagged frames. If a wireless device configured with a VLAN ID is attached to an access point with a matching VLAN ID, or if the wireless device is attached to a non-VLAN access point, then the wireless device may send and receive raw/untagged frames. In addition to the gateways described below, the ability of a wireless device to detect when it can send untagged frames is considered novel.

In another embodiment of the invention, a special ID that is different than the native VLAN ID for a switch port is used for VLAN-unaware devices. This allows such devices that do not issue tagged frames to belong to a single VLAN ID.

In terms of information exchange between access points and wireless devices (also referred to herein as "stations"), alternatives other than those described below are also contemplated. For example, the 802.11 standard could be used without extensions. Such a system may utilize separate messaging as part of an association process. Alternatively, another mechanism such as the point control function or "PCF" beaconing mechanism described in the 802.11 standard could be utilized to "advertise" VLAN capabilities, with the wireless devices responding to such messages. The 802.11 protocol allows optional parameters and packets that are typically reserved, but may be used to send parameters such as VLAN ID and VLAN capability information.

Other embodiments and advantages of the present invention are described below.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION

The IEEE 802.1Q standard specifies a virtual LAN (VLAN) protocol that runs on top of the IEEE 802.1D protocol for MAC bridges/switches. The IEEE 802.1Q standard provides the following: a) it defines a method for associating a station with a virtual LAN, so that the physical connection for the station can be moved without changing the station's network (e.g., IP) address; b) it defines a method for prioritizing time-bounded traffic; and c) it extends GMRP, a dynamic multicast filtering protocol defined in IEEE 802.1D, so that it supports multiple virtual LANs.

The IEEE 802.1Q protocol is defined for MAC bridges/switches and VLAN-aware end stations. In practice, IEEE 802.1Q is implemented in layer 2/3 VLAN switches and in VLAN-aware servers and routers. It is transparent to existing IEEE 802 "client" end stations attached to VLAN switches.

Described below are various protocols for integrating "INCA" access points and mobile VLAN-aware client stations into an IEEE 802.1Q VLAN network. The term "INCA" is used herein to refer generally to wireless devices such as wireless roaming devices or mobile stations.

A mobile INCA/VLAN network has at least the following advantages over prior network configurations:

1) It provides protocol-independent mobility across IP subnet boundaries.
2) It provides a mechanism for prioritizing real-time traffic (i.e., VoIP) both in the wireless network and throughout the switched network;
3) It provides an efficient mechanism for delivering multicast/broadcast traffic to stations that have roamed to another subnet;

4) GMRP dynamically limits multicast traffic to those radio ports with multicast group members; and
5) It provides a mechanism for logically isolating multiple broadcast domains that exist in the same radio coverage area.

A VLAN ID is similar to a broadcast domain, where an IP subnet is an example of a broadcast domain. A radio coverage area, such as an 802.11 Basic Service Set (BSS), may contain stations from multiple broadcast domains. VLAN tagging provides a method for logically isolating broadcast domains, so that broadcast/multicast frames for one domain are not received by stations in another domain. Note that logical isolation of broadcast domains, in a BSS, requires that stations directly support VLAN tagging. In general, an assumption is made herein that VLAN-unaware stations in a BSS should belong to the local VLAN (i.e., subnet). VLAN-aware stations can belong to any VLAN.

Also described below is a method for providing subnet mobility for VLAN-unaware mobile IP stations. The method has the advantage that it does not require VLAN-support in the mobile station.

The IEEE 802.1Q standard defines a "tagged VLAN" protocol. A "tag header" is used to explicitly associate a priority value and, optionally, a VLAN ID with a frame. The "priority" field, in a tag header, is always valid. A value of 0 is used for normal data, and values 1 through 7 are used for expedited data. The VLAN ID field, in a tag header, is set to the "null VLAN ID" value of 0, to indicate that the tag header does not carry a valid VLAN ID. A VLAN ID value from 1 to hexadecimal FFE is used to explicitly tag a frame with a VLAN ID. A "tagged frame" has a tag header. A "priority-tagged frame" has a tag header with a null VLAN ID. A "VLAN-tagged frame" has a tag header with a non-null VLAN ID.

Typically, all frames in a switched VLAN network are either implicitly or explicitly associated with a VLAN ID. VLAN-tagged frames are explicitly associated with the VLAN ID in the tag header. Untagged frames and priority-tagged frames are implicitly associated with a VLAN ID.

A "VLAN AP" or "VLAN station" is VLAN-aware and is configured with a non-null VLAN ID. A "primary VLAN AP" is attached to a VLAN switch port. A "wireless VLAN AP" is attached to the primary LAN, directly or indirectly, through a primary VLAN AP. A "non-VLAN AP" or "non-VLAN station" is VLAN-unaware and is not configured with a VLAN ID. A VLAN station is considered a "local station" when it is associated with a non-VLAN AP or a VLAN AP with the same VLAN ID; otherwise, it is a "guest station". In the disclosed embodiment, a non-VLAN station is always a local station.

A "distribution LAN" is any Ethernet LAN. The "primary distribution LAN," or simply "primary LAN", in an INCA network, is the Ethernet LAN attached to the root AP. In a switched VLAN network, each logical VLAN can function as the primary LAN for an INCA spanning tree. As used herein, an "attribute group" is either a single VLAN or a multicast group. A mobile station "attaches" to a network through a parent AP. An "attach request" may be either an 802.11 (re)association request or an INCA ATTACH request PDU.

Figure 1:
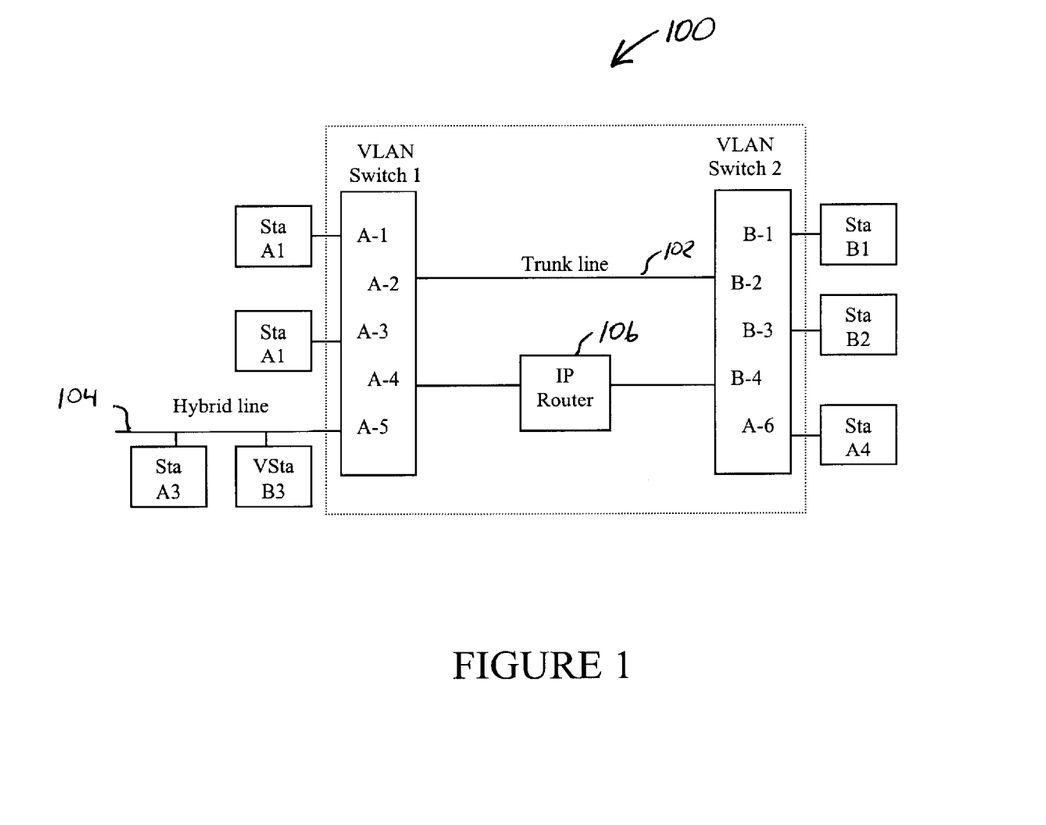
FIG. 1 illustrates an exemplary VLAN network having two VLANs.

FIG. 1 illustrates an exemplary VLAN network with two VLANs, comprising elements labeled as Ax and Bx, respectively. Switch 1 has 5ports that belong to VLAN A, labeled A-1 through A-5. Switch 2 has 4 ports that belong to VLAN B, labeled B-1 through B-4, and 1 port that belongs to VLAN A, labeled A-6. A trunk line 102 is used to connect two VLAN switches. Only VLAN-tagged frames may be transmitted on the trunk line 102. The wired stations labeled Sta A1 through Sta A4 belong to VLAN A. The wired stations labeled Sta B1 through B3 belong to VLAN B. An IP router 106 forwards packets between stations in VLAN A and VLAN B.

In the illustrated network, port A6, on switch 2, was reassigned to VLAN A when station A4 was moved to switch 2. Station B3 is a VLAN-aware station; therefore, station B3 can be moved without reassigning a VLAN port.

The "hybrid line" 104 has both a VLAN station, B3, and a non-VLAN station, A3. Station B3 sends and receives VLAN tagged frames. An INCA primary VLAN AP is attached to a VLAN switch on a hybrid port, such as port A-5.

If the non-VLAN station A4, for example, sends a frame to the MAC address of the IP router 106 for the VLAN A interface (e.g., the interface connected to port A-4), then the frame is first be tagged and forwarded on the trunk line to switch 1. In practice, the components encompassed by the dotted box can be combined into a single layer 2/3 VLAN switch.

VLAN Overview

In an 802.1Q network, a member station belongs to a single logical VLAN and each VLAN is assigned a unique identifier or VLAN ID. Frames for the member stations of a VLAN are implicitly or explicitly associated with the VLAN ID. Broadcast and multicast frames from a VLAN station are only forwarded to other members of the station's VLAN. Likewise, unicast frames are only flooded to member VLAN ports, if the destination is unknown. A layer 3 router generally forwards frames between two VLANs. In practice, layer 2/3 VLAN switches typically provide both layer 2 bridging services and layer 3 routing services.

In an installation with 802.1 Q VLAN switches, the physical connection for a station can be moved to any switch port without changing the station's network (e.g., IP) address. 802.1Q defines a protocol called GVRP (GARP VLAN Registration Protocol) that is used to propagate VLAN membership information, throughout the switched network, when a station moves. GVRP runs on top of GARP (Generic Attribute Registration Protocol). As its name indicates, GARP supports the registration of generic attributes.

All bridges/switches and LAN segments in a bridged LAN infrastructure may be organized into a single 802.1 D spanning tree or, alternatively, a separate spanning tree for each VLAN. All VLANs are aligned on branches of the underlying spanning tree. A single VLAN is comprised of a subset of interconnected spanning tree segments. Frame tagging allows multiple VLANs to share a single physical LAN segment. GVRP allows VLAN segments to be added and deleted dynamically.

BPDUs (bridge protocol data units) are used to build an 802.1D spanning tree and GVRP PDUs are used to associated spanning tree segments with a VLAN. BPDUs and GVRP PDUs are never sent with a tag header and are not forwarded by the bridge relay process.

GMRP (GARP Multicast Reservation Protocol) is used for dynamic multicast address filtering and also runs on top of GARP. GMRP is part of the 1998 IEEE 802.1D standard. The 802.1 Q standard defines an extended GMRP for VLAN-specific multicast filtering. A VLAN tag header is used to associate GMRP PDUs with a specific VLAN. An overview of GARP and INCA proxy GARP services is provided below in the section entitled "GARP Overview".

A VLAN ID is associated with each VLAN switch port. In practice, non-VLAN stations are implicitly associated with their switch port VLAN ID. It should be noted that the standard does not preclude other methods for associating non-VLAN stations with a VLAN ID. For example, it is possible to associate an 802 address with a VLAN ID. VLAN stations are explicitly configured with a VLAN ID. A guest VLAN station is a VLAN station that accesses the network through a VLAN port with a different VLAN ID. Guest VLAN stations must send and receive VLAN-tagged frames.

A switched VLAN network, with multiple VLANs, can provide the primary distribution LAN for one or more INCA spanning trees. Each INCA spanning tree is associated with a single VLAN and VLAN ID. Mobile INCA/VLAN 802.11 stations can attach to any INCA spanning tree with a matching 802.11 security ID.

There are at least two primary challenges for a mobile VLAN implementation. First, VLAN membership information for VLAN "guest stations" should be reliably distributed to the VLAN switched network. Second, in a switched network, "backward learning" is used to establish a switched path between any two stations that are actively communicating. When a mobile station roams, any switched paths for the mobile station should be reliably re-established. The section entitled "VLAN roaming" discusses the problem and exemplary solutions.

GARP Overview

The Generic Attribute Registration Protocol (GARP) defines a method for distributing generic group membership information throughout an 802.1D network. "Garp applications" run on top of GARP. Currently, there are two defined GARP applications—GVRP and GMRP. A GARP application is associated with a unique 802 group address.

A GARP applicant should send a multicast "join" message to join an attribute group (e.g., a VLAN or multicast group) on a switch port. The GARP protocol requires that a join message must be sent at least twice for any attribute group. A station does not have to send a "join" message for an attribute if it hears two join messages, for the same attribute, from other stations in the same collision domain. A station sends a "leave" message to leave an attribute group. Switches send a periodic "leave_all" message, for an attribute group, to determine if there are any active members in the group. Stations must (re)join the group after a leave_all message is transmitted, or the switch will delete the attribute group.

Generally, the GARP protocol does not work well with traditional radio stations because leave_all messages are unreliable, and periodic leave_all messages constantly wake up sleeping stations. In addition, a station in a BSS cannot directly receive multicast frames (e.g., join frames) from other stations; therefore, station requests must be retransmitted by the AP. If the retransmission is delayed, until the next DTIM beacon, for example, then a leave_all message can trigger many join messages.

A GMRP/GVRP gateway in an INCA AP supports both INCA and non-INCA mobile stations. It allows INCA stations to reliably attach and register multiple attributes with a single packet. The gateway requires that stations "join" an attribute group immediately after associating with an AP and periodically, thereafter. The AP maintains a table of attribute values for each attribute type. The gateway processes and filters periodic leave_all messages, such that sleeping stations are not constantly awakened.

INCA VLAN Operation

Overview

Figure 2:
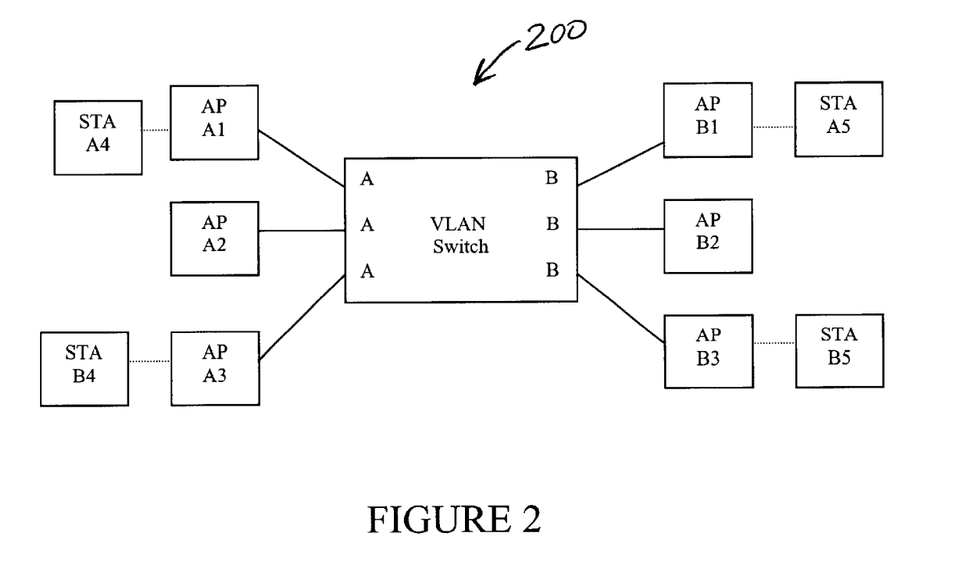
FIG. 2 illustrates an exemplary VLAN/INCA network implemented in accordance with the present invention.

FIG. 2 illustrates an exemplary VLAN/INCA network 200 implemented in accordance with the present invention. The network 200 comprises two VLANs, generically labeled as A and B. APs A1, A2, and A3 and mobile stations A4 and A5 belong to VLAN A. APs B1, B2, and B3 and mobile stations B4 and B5 belong to VLAN B. Stations B4 and A5 are "guest stations"; therefore, B4 and A5 must send and receive VLAN-tagged frames. In a more complex VLAN network, switches are interconnected by "trunk" LAN segments that only carry tagged frames.

A primary VLAN AP is, by definition, connected to the INCA primary LAN through a VLAN switch port. A wireless VLAN AP is, by definition, attached to the primary LAN through a primary VLAN AP and inherits its VLAN ID and VLAN capabilities from the primary VLAN AP.

A primary or wireless VLAN AP advertises its VLAN ID and VLAN capabilities to mobile stations. By default, a guest VLAN station registers its VLAN ID with its parent AP and sends/receives VLAN-tagged frames; a local VLAN station sends/receives untagged frames or priority-tagged frames; a non-VLAN station always sends/receives untagged frames. In general, VLAN-tagged frames are only forwarded to those AP ports and switch ports that have stations that are members of the respective VLAN.

In the disclosed embodiment, INCA VLAN support is structured such that both INCA and non-INCA VLAN stations can participate in GVRP and/or GMRP. GARP PDUs and tagged frames, from INCA or non-INCA stations, are transparently forwarded inbound by non-VLAN APs and wireless VLAN APs. In general, it is assumed that a VLAN AP transparently forwards frames without modifying, adding, or deleting the tag header. Instead, the 802.1Q switch, connected to the AP, is responsible for modifying, adding, or deleting a tag header, as required. However, it is possible for an AP to add or delete a tag header in frames that pass through the AP to provide extended services.

INCA VLAN Gateway

A GVRP gateway in a primary VLAN AP provides proxy GVRP application services for INCA or non-INCA guest stations so that guest stations in the AP's subtree appear as VLAN-aware end stations attached to the AP switch port. In one embodiment, the gateway implements the GARP "Simple Applicant" state machine defined in the 1998 IEEE 802.1d specification. The gateway generates two proxy JoinIn requests for a VLAN attribute when it first receives a registration request for a VLAN ID that is not currently active, where a registration request can be contained in a GVRP "join" request, an 802.11 (re)association request, or an INCA ATTACH request. Note that it is possible to automatically generate a proxy "join" request for a VLAN ID when a VLAN-tagged frame is received with a VLAN ID that is not currently active. However, this approach requires that a mobile station send a VLAN-tagged frame whenever it roams to a remote VLAN port. It is assumed that a non-INCA VLAN station will satisfy this requirement by sending a GVRP "join" request. The gateway responds to a GVRP "leave_all" message, for an active VLAN ID, with two JoinIn requests; therefore, it is not necessary for stations to respond. The gateway can be configured to forward both "leave_all" and proxy "join" messages to mobile stations, to support non-INCA VLAN stations. The gateway can also be configured to send periodic JoinIn messages for any active VLAN IDs. The gateway generates a LeaveEmpty message for non-native VLAN IDs that become inactive. By default, GVRP protocol messages are not forwarded into the radio network.

A GMRP gateway in a primary VLAN AP according to one embodiment of the invention provides proxy GMRP application services for INCA stations that register multicast group membership in 802.11 (re)association requests or INCA ATTACH requests. The gateway may implement the GARP "Simple Applicant" state machine defined in the 1998 IEEE 802.1d specification. The gateway generates two proxy JoinIn requests for a group address when it first receives a registration for an address that is not active. The gateway responds to a GMRP "leave_all" message, for an active group address, with two JoinIn requests. The gateway can also be configured to send periodic JoinIn messages for any active multicast address. The gateway generates a LeaveEmpty message when a multicast address first becomes inactive. The gateway will forward GMRP "leave_all" messages and "join" messages into the radio network if the respective multicast group includes non-INCA stations; otherwise, GMRP messages are not forwarded into the radio network.

Proxy GARP services provide a number advantages by default, radio bandwidth is not consumed for GVRP PDUs. GMRP PDUs are only forwarded into the radio network as required. Further, INCA stations can piggyback GVRP and/or GMRP information on a single 802.11 (re)association request or INCA ATTACH request. Without the GARP gateway, a VLAN station must attach to the network and then register VLAN and multicast group participation in separate steps. Multicast group membership must be registered each time a station roams to a new AP. VLAN membership must be registered whenever a station roams to an AP on a different VLAN.

A GVRP state machine is not required for mobile INCA or non-INCA VLAN stations, and a GMRP state machine is not required for mobile INCA stations. A non-INCA station must explicitly register and maintain participation in a multicast group (i.e., with GMRP join requests) or dynamic multicast filtering cannot be used with non-INCA stations.

The GARP protocol is intended for a broadcast medium. A station will not respond to a GARP "leave_all" message if it hears a "join_in" response from at another station. In an 802.11 infrastructure network, inbound multicast frames from stations are sent to a unicast BSSID of the parent AP; other stations do not receive inbound multicast frames until the frames are forwarded back outbound by the parent AP. Since 802.11 stations cannot directly receive GARP "join" responses from other 802.11 stations, a "leave_all" message may trigger "join" requests from a multitude of stations. INCA stations are not required to respond to "leave_all" messages because the gateway provides proxy responses. Responses from non-INCA stations can be inhibited by configuring the gateway to forward proxy "join_in" messages into the radio network.

The GVRP/GMRP gateway filters unnecessary join requests. A mobile station does not have any GARP membership information when it first roams to a new AP; therefore it must register membership in an attribute (i.e., VLAN or multicast) group whenever it roams. The gateway can filter GARP "join" requests for attributes that are already active.

The GARP protocol does not tolerate well the repeated loss of "leave_all" or "join" messages. The transmission of multicast frames is inherently unreliable in an 802.11 network; therefore, proxy GARP services increase the reliability of the GARP protocol.

INCA/VLAN Configuration
  Switch port configuration.
  Unless explicitly stated otherwise, it is assumed that a switch port that provides access for an AP is configured as follows:
    The switch port is associated with a specific "native" port VLAN ID. If a VLAN ID is not explicitly configured for the port, then the default VLAN ID of 1 is used.
    The switch port is configured to accept untagged frames. The port VLAN ID provides the VLAN ID for received raw or priority-tagged frames that are not, otherwise, associated with a VLAN ID.
    The switch port is configured to transmit frames that are associated with the port VLAN ID as untagged frames. Frames associated with a different VLAN ID are always transmitted on the port as VLAN-tagged frames.

In general, a switch port that provides access for an AP is configured as if it is attached to a "hybrid link," a link that has both VLAN and non-VLAN stations.

VLAN AP Configuration

A separate INCA spanning tree, with a unique INCA LAN ID and VLAN ID, must be configured for each VLAN. An INCA/IP link cannot be used to connect an IP subnet that can be reached through the switched VLAN network.

The default VLAN ID for an AP is 0, the null VLAN ID. A non-VLAN AP has a null VLAN ID and is transparent to VLAN APs, stations, and switches, except that it does not advertise VLAN information.

A primary VLAN AP should be connected to a VLAN switch port and is configured with a non-null "native" VLAN ID. The AP VLAN ID should match the VLAN ID of its switch port. In a single INCA network, all primary VLAN APs and switch ports should be configured with the same VLAN ID. A wireless VLAN AP inherits the VLAN ID of its parent AP.

A primary or wireless VLAN AP can be configured to support non-VLAN guest stations. If non-VLAN guest stations are supported, then: a parent VLAN AP adds a VLAN tag to frames from non-VLAN guest stations; a parent VLAN AP removes tag headers for frames sent to non-VLAN guest stations. Note that multicast frames may be sent twice, with and without a VLAN tag, if the BSS contains both VLAN and non-VLAN guest stations. Also note that local stations may incorrectly receive untagged multicast frames destined for guest non-VLAN stations, if this option is used.

A VLAN AP can be configured to support priority-tagged frames. By default, priority-tagged frames are not supported. A VLAN AP can be configured to support dynamic multicast address filtering. By default, multicast address filtering is disabled. If multicast address filtering is enabled, then static multicast group memberships can be configured for stations that do not support dynamic multicast filtering.

The user can configure a list of enabled mobile VLAN IDs. By default, all VLAN IDs are enabled. VLAN-tagged frames are discarded if the VLAN ID is not enabled.

VLAN Station Configuration

A mobile VLAN station is configured with a non-null VLAN ID. A mobile VLAN station should dynamically register its VLAN ID and multicast addresses that are enabled on its network adapter. A VLAN station can be configured so that it always sends tagged frames.

Ethernet Secondary LAN

An Ethernet Secondary LAN can contain VLAN switches; however, secondary LAN switches may not be able to fully participate in the VLAN network because GVRP frames are not forwarded outbound in the INCA spanning tree.

INCA/VLAN Protocol

A VLAN AP advertises VLAN information in a VLAN element in 802.11 beacon and probe response PDUs and INCA HELLO packets. The VLAN information includes the AP VLAN ID and flags that indicate if the AP supports priority frames and/or dynamic multicast address registration. The VLAN ID can be 0 (i.e., null) to indicate that the AP only supports priority frames and/or multicast address registration.

INCA VLAN Station Operation

An INCA VLAN station processes a VLAN element in 802.11 beacon and probe response PDUs to determine the VLAN ID and VLAN capabilities of the respective AP. An AP that does not include a VLAN element in beacon and probe response PDUs is considered as a non-VLAN AP.

By default, a VLAN station that is attached to a non-VLAN AP can only transmit untagged frames. A VLAN station can be configured so that it always transmits tagged frames. A VLAN AP can be further configured to remove tag headers, with a matching VLAN ID; otherwise, tag headers are removed by VLAN switches. A station that is attached to a VLAN AP that has a matching VLAN ID can send either VLAN-tagged frames, with the mutual VLAN ID, or untagged frames. A station that is attached to a VLAN AP, with a different VLAN ID, can only send VLAN-tagged frames, with the station's VLAN ID.

In the disclosed embodiment of the invention, a VLAN station discards received frames that are not associated with its VLAN ID. Untagged frames and priority-tagged frames from a non-VLAN AP are implicitly associated with the station VLAN ID. Untagged frames and priority-tagged frames from a VLAN AP are associated with the AP VLAN ID. VLAN-tagged frames are associated with the VLAN ID in the tag header. Therefore, a VLAN station, that is attached to a VLAN AP, with a matching VLAN ID, or to a non-VLAN AP, can receive untagged frames, priority-tagged frames, or VLAN-tagged frames with a matching VLAN ID. A "guest" VLAN station that is attached to a VLAN AP with a different VLAN ID can only receive VLAN-tagged frames with a matching VLAN ID.

A VLAN station may explicitly register its VLAN ID, with a GVRP join request, whenever it associates with a non-VLAN AP. An INCA VLAN station can a) explicitly register VLAN membership with a VLAN element in an attach request or with a GVRP join request, or b) implicitly register VLAN membership by sending a VLAN tagged frame. An INCA VLAN AP assumes that a station belongs to the local VLAN, until the station either registers a VLAN ID, for a different VLAN, or sends an inbound VLAN-tagged frame for a different VLAN. An AP may generate a proxy GVRP join request if it receives a VLAN-tagged frame, with a "new" VLAN ID.

Note that in a network that only has VLAN APs, a station can simply send VLAN-tagged frames and receive tagged or untagged frames. It does not have to monitor Beacon elements or register VLAN membership.

Non-INCA VLAN Stations

A non-INCA station can register VLAN membership with a GVRP join request. It may not be possible for a non-INCA VLAN station to determine when it has roamed to or from its home VLAN. Therefore, a non-INCA VLAN station may send VLAN-tagged frames on its home VLAN. A VLAN AP can be configured to remove VLAN tag headers where the VLAN ID in the header matches the local VLAN ID.

Non-VLAN APs

A non-VLAN AP will forward VLAN-tagged frames and GVRP PDUs with normal routing logic. Therefore, it is possible for a VLAN station to transparently participate in a VLAN network through non-VLAN APs. A VLAN station that attaches to non-VLAN APs should fully implement GVRP.

INCA VLAN AP Operation

As noted above, a primary INCAVLAN AP is configured with a VLAN ID and is attached to a VLAN switch port with a matching ID. A wireless VLAN AP inherits the VLAN ID of its parent AP.

A wireless AP forwards VLAN registration requests, from stations, inbound to the primary VLAN AP on the primary LAN. A wireless AP forwards tagged and untagged frames with normal INCA routing. Frames are always forwarded inbound if the destination is unknown.

A primary VLAN AP maintains local VLAN membership, on its switch port, by responding to GVRP "leave_all" messages according to the GARP specification. Therefore, a VLAN AP discards a VLAN registration request from a station, if the VLAN ID for the station matches the AP's VLAN ID.

A VLAN AP processes GVRP registration requests from guest VLAN stations. A VLAN AP creates or updates an entry in a "VLAN table" when it receives an inbound VLAN registration request. Each entry in the table represents an active VLAN and contains the VLAN ID, an optional list of registered multicast addresses, a port map, and a count field. The port map indicates on which ports the VLAN ID is active. The count field is used to store the number of stations that are active for a given VLAN ID. The count field is incremented when a station, with the corresponding VLAN ID, is added to the route table. The count field is decremented when a station is deleted from the route table. An entry in the VLAN table is deleted when the count reaches zero. Two GVRP "join" requests are generated when an entry is first added to the VLAN table.

When an entry in the VLAN table is deleted, an AP generates a GVRP "leave" request for the respective VLAN ID. If the entry also contained a list of registered multicast addresses, for the VLAN ID, then a GMRP "leave" request is generated (see below).

If a VLAN AP receives a "leave all" GVRP request PDU, on its Ethernet port, and it does not have an entry, with a matching VLAN ID, in its VLAN table, then it simply discards the PDU; otherwise, if the AP has a matching entry, it responds with a proxy GVRP "join" request. A VLAN AP also stores the VLAN ID, for a station, in the route table entry for the station.

Tagged Frame Forwarding

Guest VLAN stations send and receive tagged frames. Described below is a methodology for routing tagged frames for guest stations through the local INCA spanning tree.

a) A VLAN-tagged multicast frame, from a guest station, is generally forwarded inbound to the primary VLAN AP on the primary distribution LAN. Note that the VLAN switched network is responsible for delivering the multicast frame to other VLAN APs on the primary LAN. If universal multicast flooding is enabled, then the frame is also flooded outbound, in the subtree rooted at the VLAN AP, to those AP radio ports that are marked as active (e.g., in AP VLAN tables) for the respective VLAN ID.

b) A VLAN-tagged multicast frame that originates on the primary distribution LAN is forwarded into the radio network by each primary VLAN AP that has a VLAN table entry for the respective VLAN ID. The frame is forwarded to those AP radio ports that are marked as active for the respective VLAN ID.

c) A VLAN-tagged unicast frame, with a known destination, is routed to the unicast destination, with normal INCA routing.

d) A VLAN-tagged unicast frame, from a guest station, with an unknown destination, is always forwarded inbound to the primary VLAN AP on the primary LAN. If universal unicast flooding is enabled, then the frame is also flooded outbound, in the subtree rooted at the VLAN AP, to those AP radio ports that are marked as active for the respective VLAN ID.

e) If unicast flooding is enabled, then a VLAN-tagged unicast frame with an unknown destination, that originates on the primary distribution LAN, is flooded into the radio network by each primary VLAN AP that has a VLAN table entry for the respective VLAN ID. The frame is flooded to those AP radio ports that are marked as active for the respective VLAN ID.

VLAN Roaming

Backward Learning Issues 802.1D/802.1Q switches use "backward learning" to "learn" the location of stations. The 802.1D standard requires a bridge/switch to update its dynamic filtering data base on each received frame. If a switch learns that station A is on port 1, for example, then frames destined to station A are a) discarded if the source port is port 1, or b) forwarded only on port 1 if the source port is not port 1.

In practice, an 802.1Q switch maintains a single filtering database, for all active VLANs, that is updated with normal backward learning. A switch generally cannot "learn" that a station has roamed until it receives a frame from the station at its new location. It cannot be guaranteed that a station will generate a data frame, after it roams; therefore, an INCA AP attached to a distribution LAN, will generate an INCA DIST_ATTACH PDU, in proxy, for a station when it first roams to the AP. The DIST_ATTACH is sent with the Ethernet source address of the station to cause any intermediate switch, on the distribution LAN, to update its filtering database entry for the station. Note that a DIST_ATTACH PDU should be generated by the AP that is responsible for bridging to the distribution LAN for the respective station, to avoid incorrect switch filtering database updates. The path for a station, that has roamed, may become disconnected if an intermediate switch does not learn the new path to the station (e.g., because a DIST_ATTACH PDU was lost).

INCA Alert Protocol

This section discusses changes to the INCA inter-access-point protocol which guarantee that switched paths for a mobile station will be reliably re-established when a station roams. The discussion applies to VLAN and non-VLAN switched/bridged networks.

It may be difficult to implement a completely robust IAPP "handoff" protocol (primarily because an AP should not retransmit unsequenced handoff requests). If an IAPP handoff fails, then an old disconnected path fragment will exist after a station roams. The INCA IAPP combines a handoff protocol with an "alert protocol", that is used to "clean up" old disconnected path fragments (e.g., if a handoff fails). The alert protocol relies on transmit status information from the AP radio. An INCA alert request is generated for an 802.11 station, for example, if an 802.11 transmission to the station results in an RTS retry error. An alert request is forwarded inbound until it reaches the primary LAN, where it is forwarded to the "new AP" responsible for bridging from the primary LAN to the station. If a new AP on the primary LAN exists and has a newer path to the station, then it will return an alert response. The alert response is sent to the destination address of the "old AP", on the primary LAN. It is sent with the source address of the station that roamed. In general, an alert response is always forwarded outbound on a distribution LAN with the source address of the respective station to enable bridges/switches to learn the new path to the station. An alert response is forwarded outbound until it reaches the old parent AP of the station that roamed. Therefore, any intermediate switches and APs will learn the new path to the station. Note that it is not necessary to clean up an old path fragment if the old path is not used. Unused old path fragments are aged away in both switches and APs.

Successive alert requests can be generated, for a station that roamed, for each transmission to the station on the old path fragment, until the old path fragment is deleted. To avoid excessive alert requests, the route table entry for a station is time-stamped, whenever an alert request is generated, and successive alert requests are inhibited for an ALERT_HOLD_DOWN time period (e.g., 5 seconds).

The alert protocol requires that any INCA "handoff" PDUs that may cause an AP to change or delete its route table entry for a station that has roamed be sent on a distribution LAN with the source address of the station. The requirement is necessary so that an AP, on the old path of a station that has roamed, cannot change or delete its route table entry for the station, until each intermediate switch/bridge has also updated its filtering database entry for the station. Station handoff PDUs include INCA ATTACH requests, DETACH requests, DIST_ATTACH requests, and alert responses.

If the root AP receives an ATTACH request for a station, from a new AP on the distribution LAN, it will immediately return an ATTACH response. If the old path to the station was through another "old AP" on the distribution LAN, then the root AP will include a "handoff request" element, in the ATTACH response, with the 802 address of the old AP. If the new AP receives an ATTACH response, with a handoff request, then it will generate a DETACH request, before it forwards the ATTACH response outbound. Note that the root AP does not send a DETACH request, for a station, with the station's source address, if it is not responsible for bridging the primary distribution LAN to the station. The DETACH request is sent with the Ethernet destination address of the old AP and the Ethernet source address of the respective station. The DETACH request is forwarded outbound on the old path fragment until it reaches the old parent AP. The old parent AP returns a DETACH response that is forwarded inbound to the distribution LAN, where it is converted to an ATTACH response by the new AP on the distribution LAN. The INCA handoff protocol is designed so that operational parameters, for a station that has roamed, can be transferred from both the root AP and the old AP to the new AP.

An example roaming scenario, where the alert protocol is used to recover, is given below.

Figure 3:
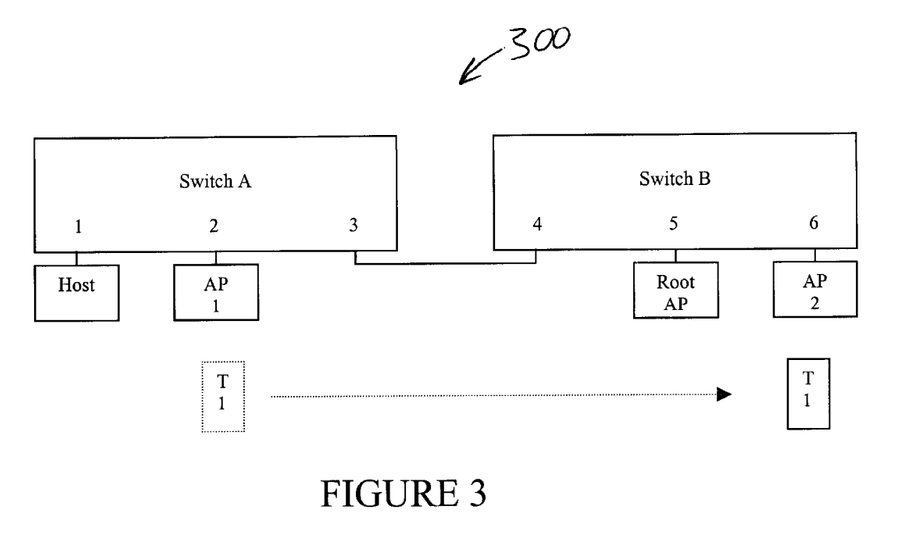
FIG. 3 illustrates an exemplary roaming scenario implementing an alert protocol in accordance with the present invention.

FIG. 3 illustrates an exemplary roaming scenario 300 implementing an alert protocol in accordance with the present invention. In this scenario, two 802.1D switches A and B are provided, each with three ports labeled 1 through 3 and 4 through 6, respectively. The switches are linked through ports 3 and 4. Assume that the terminal, T1, is attached to AP1 and is communicating with the "Host". Then switch A will learn that the path to T1 is through port 2. If the host sends a frame to T1, it will only be forwarded on switch port 2. Next assume that T1 roams to AP2 on switch B. Switch A will continue to forward frames from the host, destined to T1, on port 2 until a frame from T1 is received on a different port (e.g., port 3). AP2 then sends a DETACH request to AP1, with T1's source address. Switch A will learn that T1 can be reached on port 3 when it receives the handoff request. Note that if the root AP sends a frame (e.g., a DETACH frame) with T1's source address that switch B will incorrectly learn that T1 can be reached through port 5.

If the DETACH request is lost, then an old path fragment will still exist and switch A will continue to forward frames from the host, destined to T1, through port 2 to AP1. Now if AP1 attempts to send a frame to T1 it will receive a transmit error that indicates the terminal did not respond (e.g., an RTS_RETRY or UNASSOCIATED error). AP1 then generates an alert request and send it to the root AP. The root AP will forward the alert request to AP2. AP2 sends an alert response to AP1, with the source address of T1. Therefore, the switch will learn that the path to T1 is through port 3 when it receives the alert response.

Transport Layer Support for Roaming

The transport layer can provide reliable "backward learning." An ATTACH indication is passed to the Intermec WTP transport entity in a WTP station, when the station first attaches through a new AP. The WTP entity responds to an ATTACH indication, by sending a receive-ready (RR) command frame to the peer WTP entity (e.g., a gateway manufactured by Intermec Corporation). The RR is re-transmitted, by the station, until the peer entity responds with an RR response frame. The RR command frame guarantees that the path from the peer to the station is discovered and it causes the peer WTP entity to immediately retransmit any outstanding frames, such as those that may have been sent on an old path fragment.

Inter-VLAN Roaming

In the disclosed embodiment of the invention, an inter-VLAN handoff protocol is used to delete old route table entries for a station that roams to a different VLAN. The protocol requires that root VLAN APs participate in a VLAN IP multicast group. Normally, each root VLAN AP will use IGMP to join the multicast group.

The ATTACH request for a mobile station may contain an "old AP" address. The root AP will generate an IP_DIST_ATTACH request for a mobile station if it receives an ATTACH request, from the station, with a non-zero "old AP" address, and the "old AP" is not in its local spanning tree. The IP_DIST_ATTACH request is encapsulated with an INCA/IP GRE header and is sent to the VLAN IP multicast address. It contains the 802 address and VLAN ID of the mobile station. If the IP_DIST_ATTACH request is "ordered", it will also contain a valid path ID. The root AP for the mobile station's old VLAN will delete the local path for the mobile station, if it receives an IP_DIST_ATTACH request with a "newer" path ID. The root AP on the old VLAN should return an IP_DIST_ATTACH response if the corresponding request was sent to a multicast address.

The IP_DIST_ATTACH handoff mechanism may fail when a station roams from an "old VLAN" to a "new VLAN", if an IP_DIST_ATTACH request is not generated or is lost. Therefore, an old path fragment may exist in the old VLAN. Frames that are forwarded on the old path will be lost; therefore, a mechanism should be provided for cleaning up old path fragments. The existing INCA alert mechanism can be extended to provide an inter-VLAN alert mechanism. If inter-VLAN alerts are enabled and the root AP receives an alert request for a mobile station, it will generate an IP_ALERT request, if it does not have a new path for the mobile station. The IP_ALERT request is send to the VLAN IP multicast address and contains the address and path ID of the mobile station. A VLAN root AP, on another VLAN, will return an IP_ALERT response if it receives an IP_ALERT request, for a mobile station, and it has a newer path for the station. A VLAN root AP will delete its route table entry for a mobile station if it receives an IP_ALERT response for the station, with a newer path ID.

It is possible to optimize the handoff mechanism by sending IP_DIST_ATTACH requests to the unicast IP address of the root AP on a VLAN. The unicast IP address can be "learned" from IP_ALERT requests and from IP_DIST_ATTACH responses.

FRAME FORMATS

GARP:

General frame format.

| Field | Length | Value |
|---|---|---|
| Destination Address | 6 bytes | Hex. 0180C2000020 for GMRP, Hex. 0180C2000021 for GVRP |
| Source Address | 6 bytes | (station source address) |
| LLC Header | 3 bytes | Hex. 424203 (LLC SAP is hex. 42) |
| GARP Protocol ID | 2 bytes | Hex. 0001 |
| GARP messages | N bytes | A list of messages where each message is: <Attribute type> <Attribute List> |
| End Mark | 1 byte | Hex. 00 |

Message structure:

Attribute Type    Attribute List

Attribute list structure:

Attribute 1    Attribute N    End Mark

Attribute structure:

Attribute Length    Attribute Event    Attribute Value

GARP Operators.

0: Leave All
1: JoinEmpty
2: JoinIn
3: LeaveEmpty
4: LeaveIn
5: Empty

GVRP:

Null VLAN ID = Hex. 000
Default PVID = Hex. 001
Valid VLAN IDs = Hex. 001 to FFE (FFF is reserved)
GVRP attribute types.

Group attribute type = 1
 Service attribute type = 2
  All Groups = 0
  All Unregistered Groups = 1

GVRP JoinIn frame format.

| Field | Length | Value |
|---|---|---|
| Destination Address | 6 bytes | Hex. 0180C2000021 |
| Source Address | 6 bytes | (station source address) |
| Length | 2 bytes | Frame length = 10 |
| LLC Header | 3 bytes | Hex. 424203 |
| GARP Protocol ID | 2 bytes | Hex. 0001 |
| Group Attribute Type | 1 byte | Hex. 01 |
| Attribute Length | 1 byte | Hex. 04 |
| Attribute Event | 1 byte | JoinIn = Hex. 02 |
| Attribute Value | 2 bytes | Hex. 0001 to Hex. 0FFE (FFF is reserved) |
| End Mark | 1 byte | Hex. 00 |

Tagged Frame Formats

An Ethernet frame is tagged with a VLAN ID by inserting a tag header immediately after the Ethernet source address. The format for DIX and SNAP tagged frames is shown below.

| Field | Length | Value |
|---|---|---|
| DIX tagged frame format. | | |
| Destination Address | 6 bytes | (from untagged frame) |
| Source Address | 6 bytes | (from untagged frame) |
| DIX Tag Type | 2 bytes | Hex. 8100 |
| Tag Control Information | 2 bytes | Bits 15-13 = priority<br>Bit 12 = canonical flag<br>Bits 11-0 = VLAN ID |
| Frame Body | 0–1502 bytes | (from untagged frame - includes original frame type) |
| SNAP tagged frame format. | | |
| Destination Address | 6 bytes | (from untagged frame) |
| Source Address | 6 bytes | (from untagged frame) |
| SNAP Tag Type | 8 bytes | Hex. AAAA0300008100 |
| Tag Control Information | 2 bytes | Bits 15-13 = priority<br>Bit 12 = canonical flag<br>Bits 11-0 = VLAN ID |
| Frame Body | N bytes | (from untagged frame - includes original frame type |

Dynamic Multicast Filtering

Dynamic filters have several advantages over static filters. Dynamic filters do not require user configuration. Static filters require that the network administrator know about multicast address usage. In environments where the applications are unknown, all multicast addresses should be enabled. Static filters should be reconfigured as multicast applications change. Dynamic filters also automatically adapt to changes in the active station population. Static filters should be configured for the worst-case usage pattern. For example, consider a mobile multicast application that is used once a week. GMRP also provides a mechanism for moving multicast filters from the AP to a switch.

The GMRP protocol allows GMRP applicants to dynamically "join" or "leave" a multicast group, where a multicast group is identified by an 802 multicast address. It also allows an applicant to register a "service requirement" that, currently, can be 0, for all "multicast groups" or 1 for "all unregistered groups". A switch port can be configured with a default service requirement for non-GMRP stations. "All multicast groups" is the recommended setting for ports attached to non-GMRP stations. An "all unregistered groups" port setting is intended for environments where a) the set of multicast addresses used by GMRP stations is disjoint from the set of multicast addresses used by non-GMRP stations and where b) GMRP and non-GMRP stations are in separate collisions domains. Note that the utility of the "all unregistered groups" setting is limited in a mobile environment.

A GMRP station registers a list of zero or more enabled multicast addresses. An AP maintains a list of multicast addresses that are active on a radio port. It is not reasonable to expect a mobile station to "leave" a multicast group; therefore, entries in the list are aged and discarded after some period of inactivity. A station should reregister a multicast address before the corresponding table entry is discarded. An AP generates a proxy "leave" request when it deletes an entry in the list. An AP generates a proxy "join" request when an entry is initially created.

The default multicast group for non-GMRP stations is configurable as either "all multicast" or "no multicast", with a default setting of "all multicast". The "no multicast" option can be used if non-GMRP stations do not need to receive multicast frames. If the default group membership for non-GMRP stations is "all multicast" then an AP should perform a proxy join, for all multicast groups, when a non-GMRP station first attaches to the AP.

GMRP does not define a way to distinguish between a non-GMRP station and a GMRP station that is simply not participating in a multicast group. If the default multicast group membership for non-GMRP stations is all multicast groups, then GMRP may experience difficulties in radio networks with either non-GMRP stations or GMRP stations that do not participate in a multicast group.

If the default multicast group membership, for non-GMRP stations, is "all multicast" then an AP must generate a GMRP join request when a non-GMRP station first attaches. Therefore, an INCA AP should be able to determine whether an attach request is from a GMRP station or a non-GMRP station. To solve the problem, a GMRP station should include a list of zero or more group addresses, in an attach request. It is assumed that an attach request, without a group address list, is from a non-GMRP station. A GMRP station can also register group addresses with a GMRP join request.

As an alternative solution, an AP can start a timer for a station when it first attaches. The station is considered a GMRP station if it sends a GMRP request before the timer expires; otherwise, it is considered a non-GMRP station and the AP should generate a proxy GMRP join request. An empty GMRP group address list is a GARP message with the "Group Attribute Type" of 1 immediately followed by an "end mark". If the default group membership for non-GMRP stations is "no multicast", then no special logic is required for non-GMRP stations.

A static multicast output filter, for a radio port, can be used to avoid flooding all multicast packets, in networks where non-GMRP stations must receive multicast packets. The user can statically configure either an enabled list or a disabled list of multicast addresses for an output port. The user can also configure a precedence rule for applying static and dynamic filters. By default, a statically disabled address is enabled if it is in the list of IGMP registered addresses; a statically enabled address is enabled even if it is not in the list of GMRP registered addresses. A static list of enabled multicast addresses can be used in combination with a "no multicast" default group membership value for non-GMRP stations. A static filter only applies to multicast frames destined for non-VLAN stations or local VLAN stations.

The default filter values do not require user configuration for correct operation, because the default group membership for non-GMRP stations is "all multicast". Multicast filtering is automatically optimized in networks that contain only GMRP stations. Configuration is only required if it is necessary to limit multicast traffic in networks with non-GMRP stations.

In a VLAN installation, GMRP is extended so that each multicast registration entry is associated with a single VLAN. The rules for associating a VLAN ID with a GMRP frame are the same as for any other frame type. The VLAN ID associated with a GMRP multicast registration is the same as the VLAN ID implicitly or explicitly associated with the corresponding GMRP frame. A VLAN AP maintains a list of registered multicast addresses for each active VLAN in its VLAN table. GVRP and GMRP "leave" requests are generated when an entry in the VLAN table is deleted. The GMRP "leave" request is sent as a VLAN-tagged frame if the VLAN ID in the table entry does not match the VLAN ID of the AP. GVRP requests are always sent in untagged frames.

An INCA AP forwards GMRP frames from mobile stations, to its Ethernet port, without changing or adding a frame tag. An INCA VLAN AP generates untagged proxy GMRP requests for local stations and tagged proxy GMRP requests for guest VLAN stations.

IP Mobility for Non-VLAN Stations

A VLAN AP can be configured to provide an IP subnet roaming capability for Non-VLAN IP stations. The capability requires that each VLAN AP should be configured with a list of subnet-ID/VLAN-ID bindings, where each entry in the list contains a subnet mask, a subnet ID, and a VLAN ID. The list can be configured in root APs and distributed to other APs. Whenever an AP receives an untagged IP or ARP frame from a mobile station on a radio port, it should determine if the frame belongs to the local subnet or to a remote subnet. An AP first masks the source address in a received ARP or IP frame with its subnet ID. If the resulting subnet ID matches the AP's subnet ID, then the frame is from a "local station" and it is forwarded on the AP's Ethernet port without a VLAN tag.

Otherwise, the frame is from a "guest station" and the AP should search its list of subnet-ID/VLAN-ID bindings to determine the home subnet ID and corresponding VLAN ID for the station. The source IP address is masked with each subnet mask in the list, starting with the longest mask, until a matching subnet ID is found or until the list is exhausted. If a match is found and the corresponding VLAN ID is not null, then the frame is tagged with the respective VLAN ID before it is forwarded on the AP's Ethernet port. If the VLAN ID is null, then the frame is forwarded without a VLAN ID. If a matching subnet ID is not found, then the frame is either forwarded, without a VLAN ID, or discarded, depending on the "default action" configured by the user.

The VLAN ID and status of each guest station is stored in the AP route table. If the AP receives a VLAN-tagged frame, destined for a guest station that transmits untagged frames (e.g., a non-VLAN station), then the AP will remove the tag header from the frame before it forwards the frame to the guest station.

An AP should also maintain a list of active VLAN IDs for each radio port, where each entry in the list contains a VLAN ID, a count, and a status. The "count" field has the number of stations that are active for the VLAN ID. The status can be "tagged", "untagged", or "hybrid". If an AP receives a VLAN-tagged broadcast ARP frame on its Ethernet port, with non-local VLAN ID, then it will forward it on a radio port as follows: If the status is "tagged" then the frame is forwarded unchanged. If the status is untagged, then the tag header is removed before the frame is forwarded. If the status is "hybrid" then the port has both VLAN and Non-VLAN stations for the VLAN ID. Therefore, the frame is transmitted twice, once with a tag header and once without a tag header.

By default, a tagged multicast IP frame, received on the AP Ethernet port, is always forwarded as a VLAN-tagged frame on radio ports.

VLAN Frame Prioritization

A VLAN AP can be configured to automatically add and delete 802.1Q priority frame tags for non-VLAN stations.

802.1D/802.1Q MIB

APs according to the present invention may implement selected standard tables in the 802.1d/802.1q MIB, so that users can configure and read AP VLAN and filter parameters with standard MIB definitions.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A wireless communication network, comprising:

a switch having a port;

an access point coupled to the port, the access point configured with a virtual local area network identification value; and at least one wireless mobile terminal communicatively coupled to the access point, the access point performing proxy services for the wireless mobile terminal, the proxy services relating to responses in behalf of the wireless mobile terminal to messages from a virtual local area network.

2. A wireless communication network, comprising:

a switch having a port;

an access point coupled to the port, the access point configured to participate in a virtual local area network system; and at least one wireless mobile terminal communicatively coupled to the access point, the access point performing proxy services for the wireless mobile terminal, the proxy services relating to the virtual local area network system;

wherein the proxy services performed by the access point serves to reduce wireless communication related to the virtual local area network system, between the access point and the wireless mobile terminal.

3. The wireless communication network of claim 2, wherein the proxy services performed by the access point for the wireless mobile terminal relate to the registration of the wireless mobile terminal with the virtual local area network system.

4. The wireless communication network of claim 2, wherein the proxy services performed by the access point for the wireless mobile terminal relate to membership of the wireless mobile terminal in an attribute group of the virtual local area network system.

5. A wireless communication network, comprising:

a switch having a port;

a proxy subsystem coupled to the port, the proxy subsystem configured to participate in a virtual local area network system; and at least one wireless mobile terminal communicatively coupled to the proxy subsystem, the proxy subsystem performing proxy services for the wireless mobile terminal, the proxy services relating to the virtual local area network system;

wherein the proxy services performed by the proxy subsystem serve to reduce wireless communication related to the virtual local area network system, between the virtual local area network system and the wireless mobile terminal.

6. The wireless communication network of claim 5, wherein the proxy services performed by the proxy subsystem for the wireless mobile terminal relate to the registration of the wireless mobile terminal with the virtual local area network system.

7. The wireless communication network of claim 5, wherein the proxy services performed by the proxy subsystem for the wireless mobile terminal relate to membership of the wireless mobile terminal in an attribute group of the virtual local area network system.

* * * * *